(12) United States Patent
Jeong et al.

(10) Patent No.: US 8,849,559 B2
(45) Date of Patent: Sep. 30, 2014

(54) APPARATUS AND METHOD FOR GENERATING AND USING A GRID MAP PATH

(75) Inventors: Woo-yeon Jeong, Seoul (KR); Su-jinn Lee, Yongin-si (KR)

(73) Assignee: Samsung Electronics Co., Ltd., Suwon (KR)

( * ) Notice: Subject to any disclaimer, the term of this patent is extended or adjusted under 35 U.S.C. 154(b) by 821 days.

(21) Appl. No.: 12/656,793

(22) Filed: Feb. 17, 2010

(65) Prior Publication Data

US 2010/0211244 A1 Aug. 19, 2010

(30) Foreign Application Priority Data

Feb. 18, 2009 (KR) ........................ 10-2009-0013531

(51) Int. Cl.
*G01C 21/00* (2006.01)
*G01C 21/20* (2006.01)
*G06T 19/00* (2011.01)

(52) U.S. Cl.
CPC ............. *G01C 21/20* (2013.01); *A47L 2201/04* (2013.01); *G06T 19/003* (2013.01)
USPC ........... 701/400; 701/408; 701/411; 701/448; 701/446; 701/455; 701/469; 701/523

(58) Field of Classification Search
None
See application file for complete search history.

(56) References Cited

U.S. PATENT DOCUMENTS

| | | | | |
|---|---|---|---|---|
| 4,847,773 A | * | 7/1989 | van Helsdingen et al. | ..... 701/25 |
| 5,111,401 A | * | 5/1992 | Everett et al. | ................... 701/24 |
| 5,491,641 A | * | 2/1996 | Scepanovic et al. | .......... 716/129 |
| 6,009,359 A | * | 12/1999 | El-Hakim et al. | ............... 701/28 |
| 6,167,332 A | * | 12/2000 | Kurtzberg et al. | ............... 701/23 |
| 6,259,988 B1 | * | 7/2001 | Galkowski et al. | ........... 701/533 |
| 6,349,249 B1 | * | 2/2002 | Cunningham | ................... 701/28 |
| 6,782,319 B1 | * | 8/2004 | McDonough | ................. 701/532 |
| 6,954,153 B2 | * | 10/2005 | Choi | ........................ 340/995.12 |
| 7,069,124 B1 | * | 6/2006 | Whittaker et al. | ............... 701/28 |
| 7,539,563 B2 | * | 5/2009 | Yang et al. | ....................... 701/24 |
| 7,765,499 B2 | * | 7/2010 | De Graeve et al. | ............. 706/20 |
| 7,805,220 B2 | * | 9/2010 | Taylor et al. | ................... 700/253 |

(Continued)

FOREIGN PATENT DOCUMENTS

| | | |
|---|---|---|
| CN | 101093503 A | 12/2007 |
| JP | 05-101036 | 4/1993 |

(Continued)

OTHER PUBLICATIONS

Peter Hart et al., (1968). "A Formal Basis for the Heuristic Determination of Minimum Cost Paths", IEEE Transactions of Systems Science and Cybernetics, vol. SSC-4, pp. 100-107.
Howie Choset et al., (2007). "Principles of Robot Motion: Theory, Algorithms, and Implementation Errata!!!", pages 1-150.
Stentz, Anthony, (1994), "Optimal and Efficient Path Planning for Partially-Known Environments", Proceeding of the International Conference on Robotics and Automation.

*Primary Examiner* — Bhavesh V Amin
(74) *Attorney, Agent, or Firm* — Staas & Halsey LLP

(57) ABSTRACT

An apparatus and method for generating a path using a limited memory size are provided. An approximate path is generated based on a reduced grid map generated by reducing an original grid map. Then, an approximate path is mapped onto the original grid map, and the mapped path is enlarged and divided into a plurality of sections based on an available memory size used for path calculation. Based on a start point and a destination point set in each of the divided sections, a detailed path in each of the sections is generated.

53 Claims, 7 Drawing Sheets

(56) References Cited

U.S. PATENT DOCUMENTS

| | | |
|---|---|---|
| 7,953,551 B2 * | 5/2011 | Park et al. ............... 701/416 |
| 8,060,254 B2 | 11/2011 | Myeong et al. |
| 8,099,237 B2 * | 1/2012 | Mays et al. ............... 701/434 |
| 8,306,738 B2 * | 11/2012 | Kong et al. ............... 701/411 |
| 2002/0128771 A1 * | 9/2002 | Nagaki ....................... 701/208 |
| 2004/0116864 A1 * | 6/2004 | Boudreaux ............... 604/164.01 |
| 2005/0102097 A1 * | 5/2005 | Tanizaki et al. ........... 701/208 |
| 2006/0149465 A1 * | 7/2006 | Park et al. ............... 701/209 |
| 2007/0192910 A1 * | 8/2007 | Vu et al. .................. 901/17 |
| 2007/0293985 A1 * | 12/2007 | Myeong et al. ........... 700/245 |
| 2008/0046125 A1 * | 2/2008 | Myeong et al. ........... 700/253 |
| 2008/0273791 A1 * | 11/2008 | Lee et al. ................. 382/153 |

FOREIGN PATENT DOCUMENTS

| | | |
|---|---|---|
| JP | 06-138940 | 5/1994 |
| JP | 2000-181539 | 6/2000 |
| JP | 2003-266345 | 9/2003 |
| JP | 2005-032196 | 2/2005 |
| JP | 2007-249632 | 9/2007 |

* cited by examiner

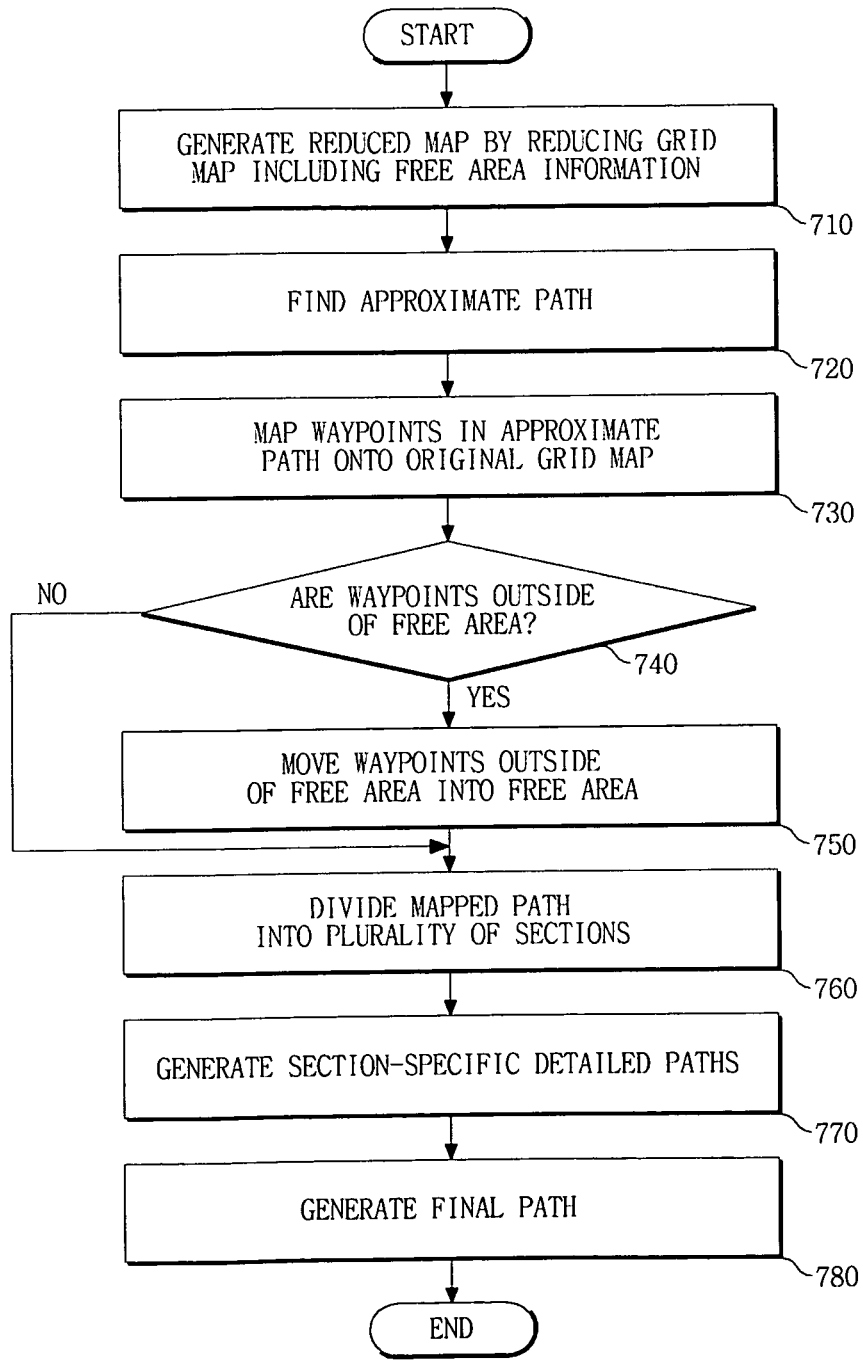

APPARATUS AND METHOD FOR GENERATING AND USING A GRID MAP PATH

CROSS-REFERENCE TO RELATED APPLICATIONS

This application claims the benefit under 35 U.S.C. §119(a) of Korean Patent Application No. 10-2009-13531, filed on Feb. 18, 2009, the disclosure of which is incorporated by reference in its entirety for all purposes.

BACKGROUND

1. Field

One or more embodiments relate to a path-finding system, and more particularly to an apparatus and method for generating and using an obstacle-avoidance path in a grid map.

2. Description of the Related Art

A path for movement of a mobile object, such as a mobile robot, is generally set using a grid map. The grid map divides a surrounding area in which the mobile object moves into smaller definable areas or grids and may represent the possibility of the existence of an object in each grid using a definable probability. In order to move to a specific location, the mobile object moves to the location along a path, using the grid map, such that it does not collide with obstacles. A conventional specific location that may be of interest for mobile robots, such as cleaning robots, is a charging station for automatic charging or a specific location for a particular task.

In general, a shortest path from an origin to a destination is typically desirably found during the generation of a path to be used by the mobile object, and thus many, if not all, available paths from the origin to the destination are sequentially examined. When a grid map is not large, the amount of calculations for such path-finding is typically not too large for an appropriate path to be rapidly generated. However, the larger the grid map, the greater the number of grids. Thus, required amounts of memory and calculations increase in proportion to the size of the grid map. Consequently, it becomes difficult for an apparatus having a limited memory or processing capacity, such as with an embedded system, to rapidly find the appropriate path.

SUMMARY

One or more embodiments relate to an apparatus and method that can reduce a memory capacity required to find a path using a grid map, and the using of the same path to move a mobile object according to the found path.

According to one or more embodiments, there is provided an apparatus for generating a path, including a path generator generating an approximate path for an object moving relative to a map, based on a reduced map generated by reducing the map, dividing the map into a plurality of sections based on divisions of the approximate path, and generating a detailed path in each of the divided sections based on the approximate path.

According to one or more embodiments, there is provided a method of generating a path of an object in a map, including generating an approximate path within a reduced map generated from reducing the map, dividing the map into a plurality of sections based upon divisions of the approximate path, and generating a detailed path in each of the divided sections based on the approximate path.

According to one or more embodiments, there is provided an apparatus for generating a path, including a path generator generating an approximate path for an object moving relative to a map, of a reduced map, dividing the map into a plurality of sections based on a mapping of the approximate path of the reduced map into the map, and generating a detailed path in each of the divided sections respectively through at least one search algorithm, wherein the path generator further sets a start waypoint and a destination waypoint in each of the divided sections based on points from the approximate path and generates the detailed path in each of the divided sections based on a path generating algorithm applied to each divided section using each set start and destination waypoint.

According to one or more embodiments, there is provided a method for generating a path, including generating an approximate path for an object moving relative to a map, of a reduced map, dividing the map into a plurality of sections based on a mapping of the approximate path of the reduced map into the map, and generating a detailed path in each of the divided sections respectively through at least one search algorithm, wherein the dividing of the map further includes setting a start waypoint and a destination waypoint in each of the divided sections based on points from the approximate path and generating the detailed path in each of the divided sections based on a path generating algorithm applied to each divided section using each set start and destination waypoint.

Additional aspects and/or advantages will be set forth in part in the description which follows and, in part, will be apparent from the description, or may be learned by practice of the invention.

BRIEF DESCRIPTION OF THE DRAWINGS

These and/or other aspects and advantages will become apparent and more readily appreciated from the following description of the embodiments, taken in conjunction with the accompanying drawings of which:

FIG. 7 illustrates a path generation method, such as illustrated in FIG. 6, in detail, according to one or more embodiments.

DETAILED DESCRIPTION

Figure 1:
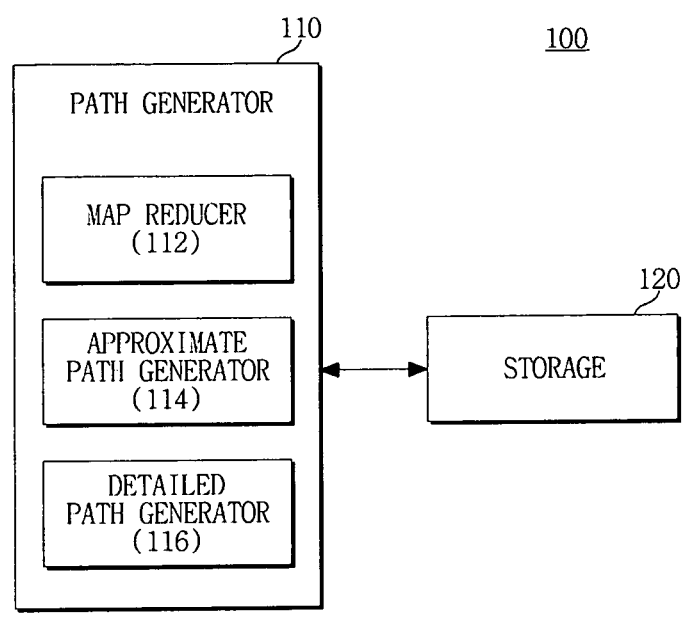
FIG. 1 illustrates an apparatus for generating a path, according to one or more embodiments.

Reference will now be made in detail to embodiments, examples of which are illustrated in the accompanying drawings, wherein like reference numerals refer to like elements throughout. In this regard, embodiments of the present invention may be embodied in many different forms and should not be construed as being limited to embodiments set forth herein. Accordingly, embodiments are merely described below, by referring to the figures, to explain aspects of the present invention.

FIG. 1 is a block diagram of an apparatus for generating a path, according to one or more embodiments. Herein, throughout the following description, the term apparatus should be considered synonymous with elements of a physical system, not limited to a single enclosure or all described elements embodied in single respective enclosures in all embodiments, but rather, depending on embodiment, is open to being embodied together or separately in differing enclosures and/or locations through differing elements. As only another example, a respective apparatus/system or method could also be controlled through one or more processing elements/devices or implemented by a distributed network, noting that additional and alternative embodiments are equally available.

Still further, in an embodiment, the apparatus for generating a path is also a mobile robot further including sensing elements for grid map generation and moving elements to move the mobile robot according to the generated path. In an embodiment, the process of generating an appropriate grid map also includes moving the mobile robot to follow the path. In addition, though embodiments may be discussed herein with regard to a mobile robot, embodiments are equally applicable to a stationary robot when the movement of the surroundings of the robot is implemented with no or limited interaction with obstacle edges or areas, for example. In an embodiment, the mobile object may equally be an avatar in a computer generated space.

Accordingly, as illustrated in FIG. 1, an apparatus 100 for generating a path may include a path generator 110 and a storage 120, for example. Briefly, as noted above, the apparatus 100 may also be a mobile robot, and include moving elements for moving the mobile robot according to the generated path. For explanation purposes, such movement control according to the path is not further discussed herein, though understood to be an appropriate embodiment. Discussions of at least such controlling and moving elements can be found in U.S. Patent Publication 2004-0116864, "Method and apparatus for moving along shortest movement path using grid map," incorporated herein. Further, herein, though discussion of embodiments has been made with regard to the mappings being based on a grid identifying location system, alternative location identifying based systems may be implemented for distinguishing the location of obstacles or obstacle areas from non-obstacle areas, for example, relative to the location of a mobile object or other object within a map.

The path generator 110 first generates an approximate path based on a reduced grid map generated by reducing an original grid map, divides the approximate path for the original grid map into a plurality of sections, and then generates detailed paths in the respective divided sections. Thereafter, these plural detailed paths can be combined to generate a detailed path for the original grid map. The path generator 110 may use a variety of path generation methods, but for simplicity, in an embodiment, it may be assumed that the paths are generated using an A-star (A*) algorithm. As an alternative, again as only an example, the paths may be generated using a D-star (D*) algorithm, a different algorithm, or a combination of different algorithms.

Briefly, the A-star algorithm is a best-first graph search algorithm that finds the least-cost path from a given initial node to one goal node (out of one or more possible goals). All possible paths form a start point to a destination point may be sequentially examined in order of increasing cost. Thus, A-star uses a distance-plus-cost heuristic function (usually denoted f(x)) to determine the order in which the search visits nodes in the tree. The distance-plus-cost heuristic may be a sum of two functions: the path-cost function, which is the cost from the starting node to the current node (usually denoted g(x)); and an admissible "heuristic estimate" of the distance to the goal (usually denoted h(x)). An early discussion or the A-star algorithm, incorporated herein, can be found in Hart, P. E., Nilsson, N. J., Raphael, B., "A Formal Basis for the Heuristic Determination of Minimum Cost Paths", IEEE Transactions of Systems Science and Cybernetics, vol. ssc-4, No. 2 (1968). The D-star algorithm is a variant of the A-star algorithm and allows for quick searching by reusing the previous search results when a direction change in the approximated path occurs during traveling. However, in actual implementation, the A-star algorithm using Image Pyramid may typically show faster processing speed than the D-star algorithm. As noted, using different algorithms between different divided grid maps is possible, but may be less efficient. Here, for example, as previous path results may be used for subsequent searches, the previous and current search algorithms are not necessarily the same. The D-star algorithm, incorporated herein, is discussed in the "Optimal and Efficient Path Planning for Partially-Known Environments", Proceeding of the International Conference on Robotics and Automation, Stentz, Anthony (1994). Similarly, and incorporated herein, both A-star and D-star, as well as other search algorithms, are further discussed in H. Choset, K. Lynch, S. Hutchinson, G. Kantor, W. Burgard, L. Kavraki, and S. Thrun, "Principles of Robot Motion," pp. 527~536. Here, it is noted that "Principles of Robot Motion" further explains incorporated discussions on processes for a mobile object to follow a defined path.

Accordingly, the storage 120 may store a grid map used for path generation, application data required for the apparatus 100 to operate, etc., noting that alternative storage elements for respective or combinations of the same are equally available. Here, in an embodiment, the storage 120 may include an available memory space sufficient to permit writing and reading of data generated in the path generation operation of the path generator 110.

The path generator 110 may include a map reducer 112, an approximate path generator 114, and a detailed path generator 116, for example.

In general, a grid map includes information indicating the probability that an obstacle exists at a particular location or area. This information may be obtained by a distance sensor such as an infrared sensor, ultrasonic sensor, or laser sensor, for example. In such a grid map, the size of a mobile object is not typically taken into account. For this reason, when a mobile object travels using a grid map, the edge of the mobile object may still bump against or collide with an obstacle even when a path is defined to not collide with the obstacle or an obstacle area. Thus, in an embodiment, the map reducer 112 takes into consideration the size of the mobile object, by reducing the mobile object in a newly generated reduced grid map to one point, and correspondingly increasing the thicknesses of a wall or edge and an obstacle or obstacle area in the generated reduced grid map. Free area(s) of the reduced grid map, i.e., areas in which the mobile object can move unrestrictedly without colliding with an obstacle or obstacle area, can thereby be further equally defined in a grid map of the reduced grid map.

In an embodiment, the map reducer 112 may generate the reduced grid map by reducing the grid map, including the information about the determined free area, by implementing an anti-aliasing filtering process, for example.

Additional or alternate factors may be relied upon when defining the reduction to be implemented in the generation of the reduced grid map. For example, when the size of the mobile object is 20 cm, and 1 cm of grid cells is mapped onto 1 dot, if the reduction rate of the original grid map is ½₀ or less, the existing obstacles may not properly reflected in the reduced grid map. Accordingly, in such an event, the rate of grid map reduction may be limited to the reduction rate at which the size of the mobile object is mapped to 1 dot. This could be considered a normalization of the grid map based on the size of the mobile object. Briefly, in an embodiment, a reason for increasing the width of walls or obstacles before path approximation could be for the case where the mobile object has to move within a predetermined spacing from the walls or obstacle. In addition, instead of increasing the width of walls or obstacles, decreasing the width of walls and obstacles is also possible, and in this case, path planning may be executed based on a shortest path on which a collision between the mobile object and walls or obstacle can be at least prevented.

Accordingly, coordinates of any original start point and destination point desired for setting an ultimate path may be represented in the reduced grid map by conversion according to extent of the reduction of reduced grid map compared to the original grid map. For example, when the original grid map is linearly reduced by $1/N^2$, the respective coordinates can merely be multiplied by $1/N$. As for the start point and destination point, their respective coordinates can, thus, be multiplied by $1/N$, and coordinates in the free area closest to the converted coordinates can be searched within the reduced grid map, i.e., if the multiplication of the start and destination coordinates results in the same being reflected in an obstacle area of the reduced grid map, and set as the reduced grid map start point and destination point.

Though linear reduction has been discussed, non-linear reduction of the original grid map is also available. In such an embodiment, if a certain grid map has been non-linearly reduced and then subjected to path planning, the grid map may desirably then be, when it is enlarged for path searching, enlarged non-linearly in inverse proportion to the non-linear reduction, e.g., instead of being enlarged simply to two times (×2).

The approximate path generator 114 may generate an approximate path in the reduced grid map from the reduced grid map start point to the reduced grid map destination point. The approximate path from the corresponding set start point to set destination point may be found using the A-star algorithm, for example.

The detailed path generator 116 may then divide the found path into two or more sections and then institute searches in the original grid map for paths from respective start points to destination points in each of the divided sections, with a combination of these detailed paths collectively being used to generate a complete detailed path for the original grid map. These instituted searches may be refinements of the approximate grid map mapped to the original grid map or near searches based upon the respective start and end points of each divided section as set by the approximate grid map. The operation of generating a detailed path will be described in greater detail below.

First, in an embodiment, the detailed path generator 116 maps waypoints in an approximate path onto a grid map including free area information, potentially before the reduction by the map reducer 112. Example waypoints 31 and 32 can be seen in grid map 410 of FIG. 4, the waypoints being movement points for the mobile object between the start and destination points. A mobile object may use each way point as an individual destination point and move from waypoint to waypoint. As a result of the mapping operation, some of the waypoints (or even the start and destination points) mapped from the reduced grid map onto the original grid map may be mapped outside of a free area, e.g., within an obstacle or obstacle area, in which a mobile object can move. Thus, the detailed path generator 116 checks whether any of the mapped waypoints are located outside of the free area of the original grid map. When some of the waypoints are located outside of the free area, they are moved to the closest locations, for example, in the free area of the original grid map.

Subsequently, the detailed path generator 116 divides the approximate path generated from the reduced grid map into a plurality of sections, sets a start point and a destination point in each corresponding divided section of the original grid map, and resets the path in each of the divided sections, a combination of which are used to generate a final detailed path.

In an embodiment, the detailed path generator 116 may divide the path into the sections, e.g., into a determined number of sections and respective sizes, based on the size of an available memory space and/or processing capabilities used for path calculation. For example, when path-finding is performed using the A-star algorithm, the amount of memory required for one grid is typically 18 bytes. Thus, when a start point and destination point are determined among waypoints in a grid map, the amount of memory needed for path calculation may be calculated. Here, in an embodiment, it is further noted that with such a division of the path into separate sections, parallel path generation processing for all sections may be implemented such that the detailed entire path may be generated in substantial less time than a conventional path generation using a single path generation process. For example, rather than mapping the approximate path back onto the original grid map and the dividing the original grid map, the original grid map may be divided into local maps based on the divided approximate path and an appropriate search algorithm, e.g., the A-star algorithm, may be applied to each local grid map. The resultant detailed paths for each local grid map may then be individually used by the mobile object in sequencing through the overall path necessary to traverse through the original grid map.

Below, it is assumed that the approximate waypoints from the reduced grid map are mapped onto the original grid map, the waypoints moved to the free area are denoted by $P_S$, $P_{S+1}$, $P_{S+2}$, ..., and $P_{S+N}$ (where N is an integer), $P_S$ is the start point, and $P_{S+N}$ is the destination point.

The detailed path generator 116 may define a section having a waypoint (e.g., $P_{S+10}$), to which a memory size for calculating a path from the start point $P_S$ does not exceed an available memory size, among the waypoints located between the original start point $P_S$ and the destination point $P_{S+N}$ in the free area as a destination point, and generate a detailed path using the grid map including the defined section. Subsequently, the detailed path generator 116 may similarly define a section having the waypoint $P_{S+10}$, which is the destination point of the respective fore section, as a start point and a waypoint (e.g., $P_{S+20}$), to which a memory size for calculating a path from the start point $P_{S+10}$ does not exceed the available memory size, as a destination point, and generate a detailed path using the grid map including this defined section. Likewise, the last section from a start point to the original destination point $P_{S+N}$ may be defined, and a respective detailed path in this defined section may be generated.

At this time, the sections may be defined such as to partially overlap each other. For example, when the destination point of the first section is $P_{S+10}$, the start point of the second section may be set to $P_{S+9}$. The detailed path generator 116 may generate a final detailed path by combining section-specific detailed paths that are set in this way.

The detailed path generator 116 may also select a changing point located at a point where a direction varies from among the waypoints located in the final detailed path. The mobile object may move along the path generated in the grid map using information about the start point, the destination point, and the selected changing point. Here, the mobile object may be a physical mobile robot, or a predetermined object, e.g., a character or avatar of a game application, set to move along a path found by a path-finding application.

The path generator 110 or apparatus 100 may further be various electronic devices, such as a cellular phone, a portable media player (PMP), or a personal digital assistant (PDA), or by a mobile object such as a mobile robot that can generate a path and move using at least one processing device. As noted above, when the path generator 110 is implemented by a mobile robot, the mobile robot may further include a sensing unit for generating a grid map, sensing the amount of movement of the mobile object, etc., a travel unit for moving the mobile object, and so on. The sensing unit may be used to generate a two- or three-dimensional mapping of the surroundings of the mobile object, e.g., thereby potentially generating all or portions of the original grid map of the surroundings of the mobile robot.

As described above, according to one or more embodiments, a grid map can be reduced and an approximate path can be generated within the reduced grid map. The approximate path may further be divided into a plurality of paths and path sections to be reflected in the original grid map. Thus, detailed paths may further be found in the divided sections of the original grid map, and ultimately combined for a final detailed path within the original grid map.

Thus, in comparison with a method of finding the entire path all at once through analysis of the entire original grid map, e.g., by repetitively using small amounts of memory, the amount of memory needed for path-finding may be reduced in proportion to the ratio by which the grid map is reduced. Since a path is found in a reduced grid map or section-specific paths are found for the entire grid map, the time taken for path-finding is reduced compared with conventional methods of finding a path for the entire original grid map.

Figure 2A:
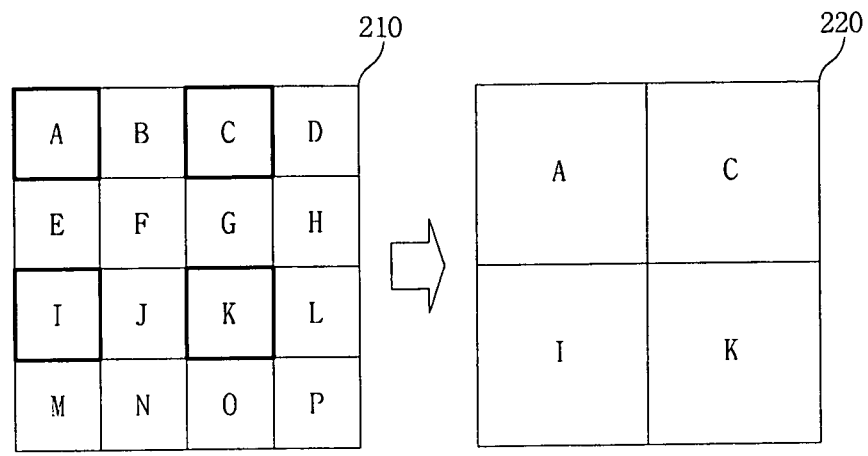
FIG. 2A illustrates a conventional method of generating a detailed path by reducing a grid map.
Figure 2B:
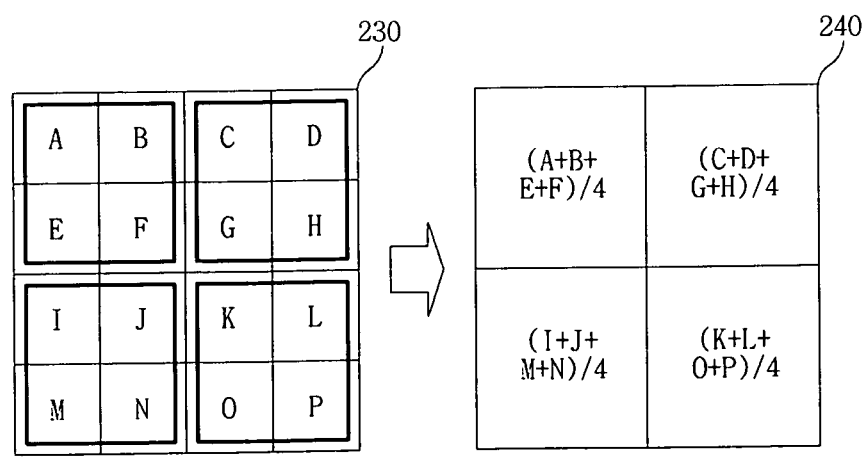
FIG. 2B illustrates a method of reducing a grid map for generating an approximated path, according to one or more embodiments.

FIG. 2A illustrates a conventional method of generating a detailed path by reducing a grid map, and FIG. 2B illustrates a method of reducing a grid map for generating respective detailed paths, according to one or more embodiments When a grid map including free area information about an area in which an object can move unrestrictedly is generated from an original grid map, a process of reducing the grid map by $1/N^2$ is performed, for example. FIGS. 2A and 2B both illustrate such methods of reducing a grid map by ¼.

FIG. 2A illustrates a process of generating a path with less required memory and processing requirements, merely by reducing an original grid map to generate reduced grid map 220, e.g., by extracting information about only a quarter of the original grid map 210, and calculating an appropriate detailed path within or from the reduced grid map 220. However, according to this method, as illustrated in FIG. 2A, information about only parts A, C, I, and K among original information are used, and information about the remaining parts is discarded. Thus, it is highly likely that a most accurate final detailed path may not be generated in this grid map reduction process due to the loss of the information about the original grid map.

Alternatively, FIG. 2B illustrates a method of reducing a grid map by anti-aliasing filtering, according to one or more embodiments. According to an embodiment, grids of a grid map 230 are grouped four by four, and group-specific averages are calculated, thereby generating a reduced grid map 240. Then, the averages are compared with a threshold value. When an average meets a threshold, e.g., equals the threshold value or more, the value of the corresponding grid may be set to 1, and when an average does not meet the threshold, e.g., is less than the threshold value, the value of the corresponding grid may be set to 0. Here, in this example, the grid value of 1 indicates that there is an obstacle, and the grid value of 0 indicates that there is no obstacle.

Figure 3:
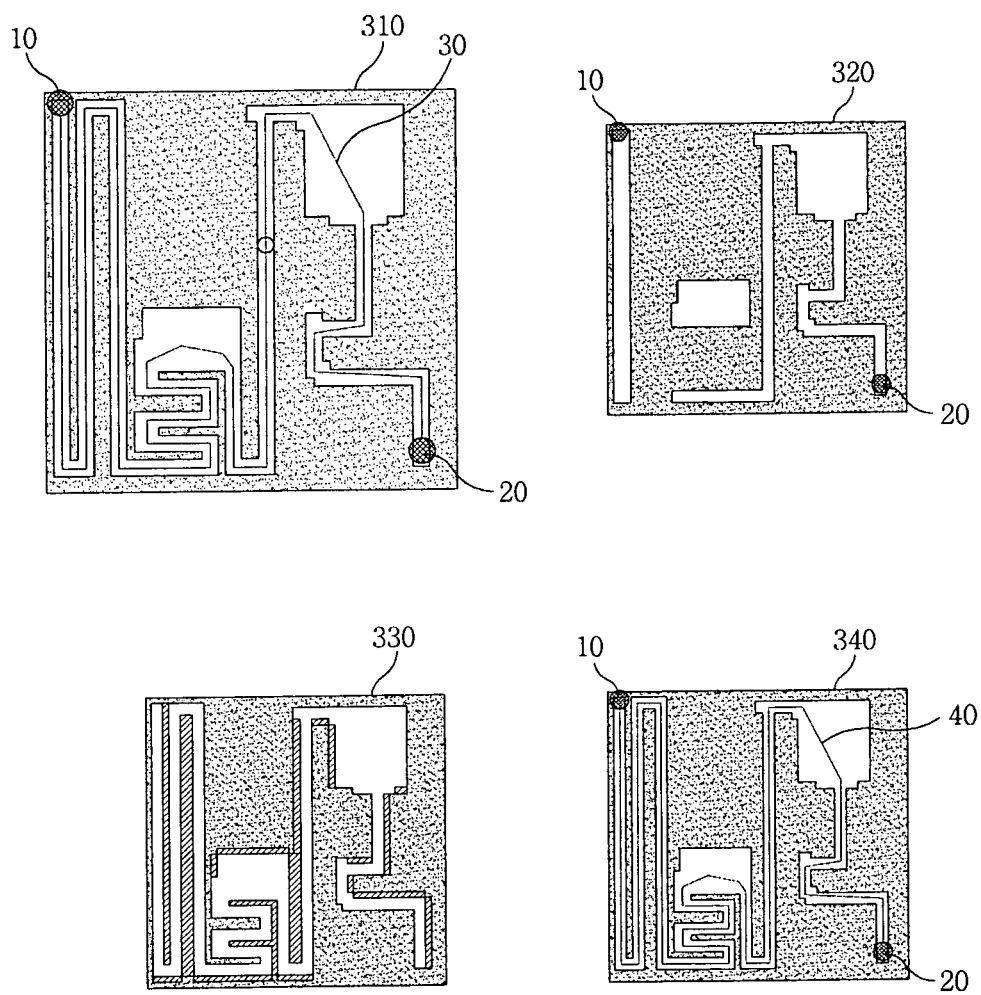
FIG. 3 illustrates results of path generating processes, according to one or more embodiments.

FIG. 3 illustrates results of path generating processes, according to one or more embodiments.

White areas within grid maps 310 to 340 denote areas in which a mobile object can move, while hatched areas denote obstacle areas. In the original grid map 310, a path 30 from a start point 10 to a destination point 20 is shown.

The grid map 320 has been obtained by reducing the original grid map 310 by ¼ using the reduction illustrated in FIG. 2A. Thus, grid map 320 further explains the path generation process of FIG. 2A. However, with this reduction and path generation process, the path 30 in grid map 310 cannot be regenerated in the grid map 320 because information about the original grid map 310 has been lost. In other words, when such a reduced grid map 320 is generated by extracting information of only a quarter of the original grid map 310, obstacle information is lost. Thus, it may become impossible to generate a correct final detailed path, as necessary paths between the start and destination may be required to cross an obstacle or obstacle areas, and thus cannot be actually used.

Alternatively, though the reduction process of FIG. 2A may be implemented with the further described section division processes in embodiments, the reduced grid map 340 may be generated if the reduction process of FIG. 2B is implemented by anti-aliasing filtering, without the loss of information. As noted above, an average as shown in the grid map 330 is compared with a threshold value. When the average meets the threshold value, a value of the corresponding grid is set to 1, and when the average fails to meet the threshold value, a value of the corresponding grid is set to 0. Then, a reduced grid map such as the drawing 340 is generated. Since the grid map 340 has less lost obstacle information than the grid map 320, for example, a path 40 as in the original grid map 310 may still be generated.

Figure 4:
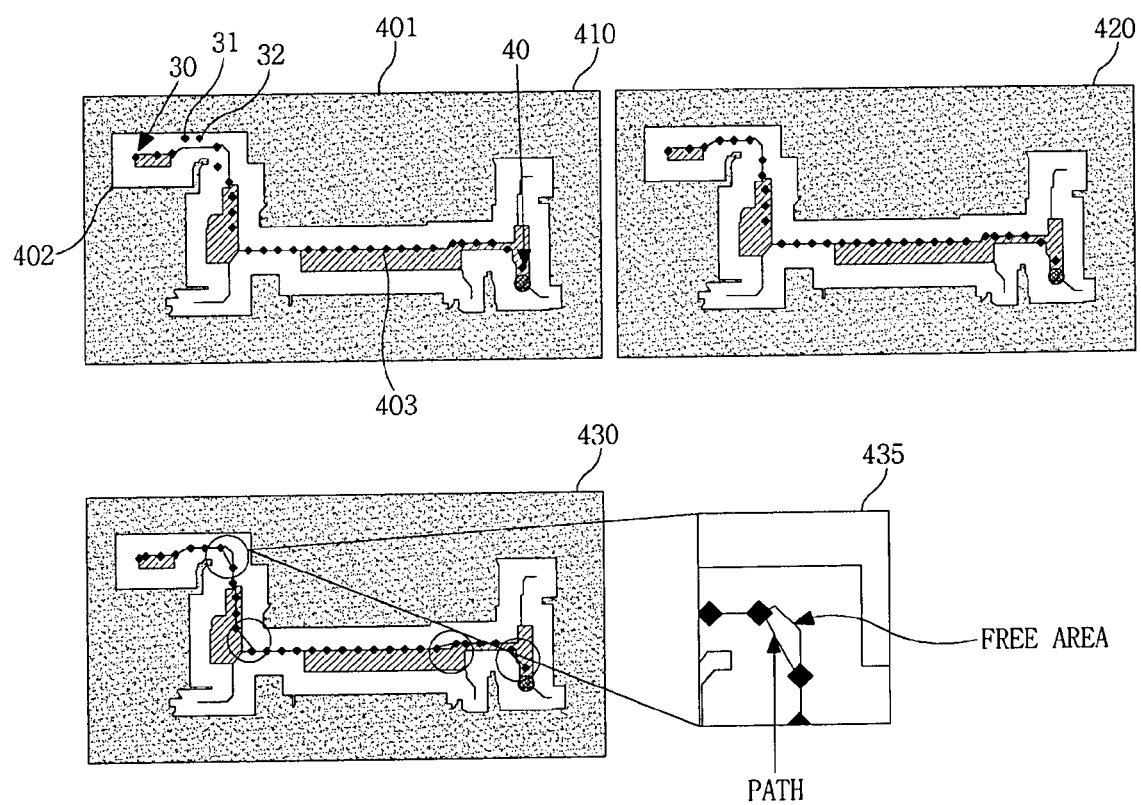
FIG. 4 illustrates a process of generating a detailed path, according to one or more embodiments.

FIG. 4 illustrates a process of generating a final detailed path, according to one or more embodiments.

In grid maps 410 to 430, a hatched area 401 outside of an obstacle boundary 402 denotes an edge of an obstacle area, and a hatched area 403 inside of the obstacle boundary 402 denotes a free area in which a mobile object can move unrestrictedly.

As noted above, when a path found in the reduced map is mapped back onto the original grid map, waypoints 31 and 32 may be mapped outside of the free area as shown in the grid map 410 of FIG. 4.

According to an embodiment, there may be a determination of whether such a waypoint is located outside of the free area. When waypoints are located outside of the free area, they may be moved to the closest locations from the waypoints in the free area, respectively. Grid map 420 illustrates the waypoints 31 and 32 mapped into waypoints in the free area.

However, as shown in grid map 430, when such mapped waypoints of grid map 420 are connected, a straight path passing through an area through which a mobile object cannot pass may be generated, as shown in an enlarged part 435 of the grid map 430. Here, enlarged part 435 shows the straight path of the mobile object being potentially beyond the defined free area of enlarged part 435. Thus, in an embodiment, according to an embodiment, an approximate path generated in a reduced grid map is replanned in the original grid map, i.e., the corresponding portion of the approximate path, which will be mapped back into the original grid map for sectional path generation, may be redefined to only traverse through defined free areas.

At this time, e.g., upon completion of the approximate path in the reduced grid map, the approximate path is divided into a plurality of sections in consideration of a memory size, e.g., for executing the A-star algorithm for path-finding as described above, and path-finding is performed in the respective sections of the original grid map, thereby generating a final detailed path. This division of the approximate path may occur within the reduced grid map or the original grid map upon mapping of the approximate path back onto the original grid map.

Figure 5:
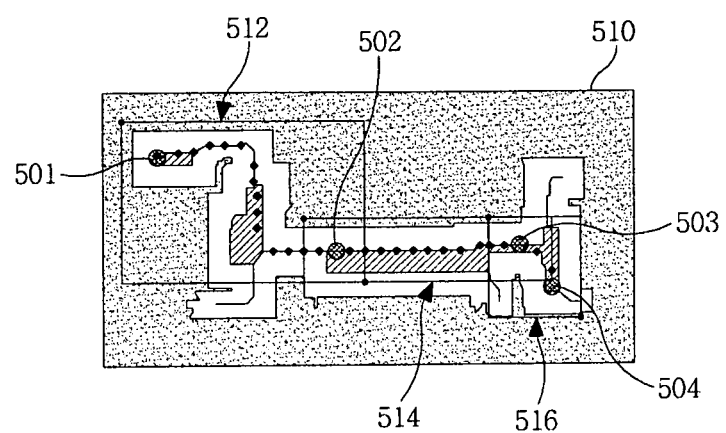
FIG. 5 is an example of a grid map in which an approximate path mapped to an original grid map has been divided into a plurality of sections to generate a detailed path, according to one or more embodiments.

FIG. 5 is an example of a grid map in which an approximate path, e.g., an approximate path that has been mapped back onto a corresponding original grid map, is divided into a plurality of sections to generate a final detailed path, according to one or more embodiments.

When a path-finding operation is performed with a sectional path in respective divided grid maps, selectively divided from an original grid map into the aforementioned plurality of sections, the size of an available memory space for executing a path-finding algorithm, for example, the A-star algorithm may be taken into account when defining the divisions. According to an embodiment, when the maximum grid size in which a path can be found using the A-star algorithm is $S_X$(X-axis grid size)$\times S_Y$(Y-axis grid size), a section from a start point $P_S$ to a waypoint $P_E$ within a range of $S_X \times S_Y$ may be determined as one set. Here, $S_X$ and $S_Y$ may vary within an available memory size, for example. In FIG. 5, path-finding is performed in each of grid map parts/sections 512, 514, and 516 including sections obtained by dividing the original grid map 510. For example, when the maximum grid size in which a path can be found using the A-star algorithm is 128×128 grid points, waypoints in the drawings 410 to 430 of FIG. 4 may be classified as shown in FIG. 5.

More particularly, in FIG. 5, a waypoint 501 denotes a start waypoint, and a waypoint 504 denotes a destination waypoint for the final detailed path for the original grid map. Waypoints 502 and 503 denote reference waypoints by which path sections are divided. In FIG. 5, a section from the waypoint 501 to the waypoint 502 may be set as a first section, a section from the waypoint 502 to the waypoint 503 may be set as a second section, and a section from the waypoint 503 to the waypoint 504 may be set as a third section, and detailed paths may be found in each section. The paths found in the respective sections may then be combined to generate a final detailed path.

Figure 6:
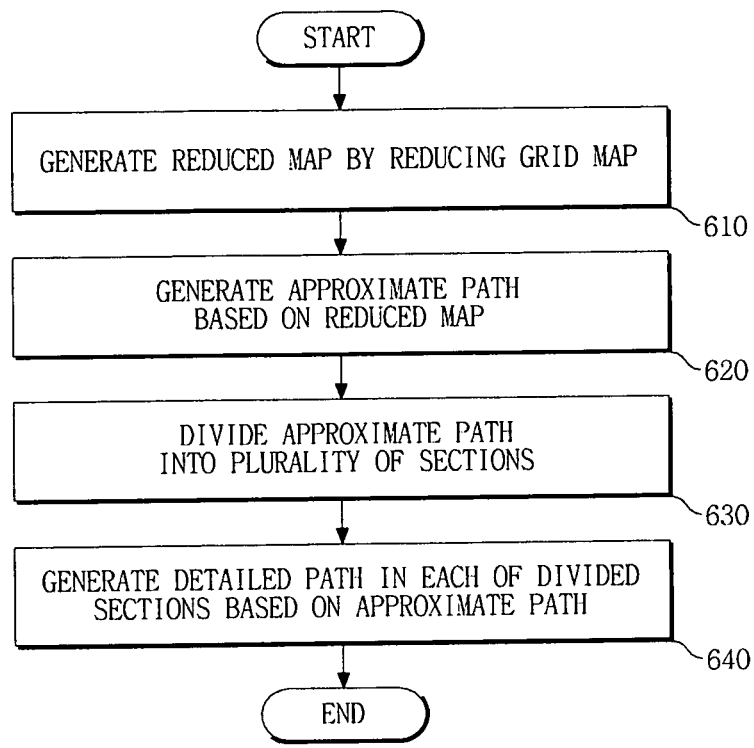
FIG. 6 illustrates a process of generating a path, according to one or more embodiments.

FIG. 6 illustrates a process of generating a path, according to one or more embodiments.

A reduced grid map is generated by reducing a grid map (operation 610). An approximate path is generated based on the reduced grid map (operation 620). The approximate path is divided into a plurality of sections (operation 630). At this time, in an embodiment, the approximate path is divided based on the size of an available memory in which writing and reading of data generated in the path generation process are performed. Detailed paths are generated in the respective divided sections (operation 640). From these detailed paths, a final detailed path can be generated.

FIG. 7 is a flowchart illustrating the path generation method, such as the path generation method illustrated in FIG. 6, in greater detail, according to one or more embodiments.

A free area in which a mobile object can move unrestrictedly is determined in consideration of a path generated from a grid map and the size of the mobile object, and a reduced grid map is generated by reducing the grid map including information about the free area (operation 710).

An approximate path may then be found based on the reduced grid map (operation 720).

Waypoints in the found approximate path may then be mapped onto the original grid map (operation 730). When some of the mapped waypoints are outside of the free area (operation 740), each of the corresponding waypoints may be moved to a closest location in the free area (operation 750).

The mapped approximate path, i.e., mapped back onto the original grid map, is divided into a plurality of sections by classifying the mapped waypoints (operation 760). A start point and destination point are set in each divided section, and detailed paths can be generated in each section (operation 770). A final detailed path may then be generated by combining the section-specific detailed paths (operation 780). Lastly, if sections of the final detailed path would not deviate from previously generated sectional paths, they may be reapplied to a subsequent final detail path generation.

In addition to the above described embodiments, embodiments can also be implemented through computer readable code/instructions in/on a medium, e.g., a computer readable medium, to control at least one processing device to implement any above described embodiment. The medium can correspond to any defined, measurable, and tangible structure permitting the storing and/or transmission of the computer readable code.

The computer readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and non-transitory transmission media such as media carrying or including carrier waves, as well as hardware elements of the Internet, for example. Thus, the medium is such a defined and measurable non-transitory structure including or carrying a signal or information, such as a device carrying a bitstream, for example, according to embodiments of the present invention. The media may also be a distributed network, so that the computer readable code is stored and executed in a distributed fashion. Still further, as only an example, the processing element could include a processor or a computer processor, and processing elements may be distributed and/or included in a single device.

While aspects of the present invention has been particularly shown and described with reference to differing embodiments thereof, it should be understood that these embodiments should be considered in a descriptive sense only and not for purposes of limitation. Descriptions of features or aspects within each embodiment should typically be considered as available for other similar features or aspects in the remaining embodiments.

Thus, although a few embodiments have been shown and described, with additional embodiments being equally available, it would be appreciated by those skilled in the art that changes may be made in these embodiments without departing from the principles and spirit of the invention, the scope of which is defined in the claims and their equivalents.

What is claimed is:

1. An apparatus for generating a path, comprising:
a path generator generating an approximate path for an object moving relative to the map, based on a reduced map generated by reducing the map, dividing the map into a plurality of sections based on divisions of the approximate path, and generating a detailed path in each of the divided sections based on the approximate path,
wherein the map is a grid map and the path generator reduces the grid map by respectively anti-aliasing filtering information from different grids of the grid map.

2. The apparatus of claim 1, wherein the path generator determines a free area in the map in which a mobile object can move unrestrictedly without collision with obstacles in consideration of a size of the mobile object, and generates the reduced map by reducing the map including information about the determined free area.

3. The apparatus of claim 2, wherein the path generator maps waypoints in the approximate path, generated in the reduced map, into the map before division of the map in order to generate the detailed paths.

4. The apparatus of claim 2, wherein the path generator maps waypoints in the approximate path, generated in the reduced map, into the map before division of the map in order to generate the detailed paths.

5. The apparatus of claim 4, wherein when one or more of the mapped waypoints are located outside of the determined free area in the map, the path generator moves the one or more waypoints located outside of the determined free area to closest locations from the waypoints in the determined free area, respectively.

6. The apparatus of claim 4, wherein the path generator classifies the waypoints mapped onto the map according to respective divided sections, of the plural divided sections, when dividing the map into the divided sections based on the divisions of the approximate path, sets a start waypoint and a destination waypoint in each of the divided sections, generates the detailed path in each of the divided sections, and generates a final detailed path by sequentially combining each of the detailed paths.

7. The apparatus of claim 6, wherein a destination waypoint for at least one divided section overlaps a start waypoint of another divided section.

8. The apparatus of claim 1, wherein the path generator generates the reduced map generated by reducing the map.

9. The apparatus of claim 8, wherein the map is a grid map and the path generator reduces the grid map using each grid of the free area of the grid map.

10. The apparatus of claim 8, wherein the reducing of the map is a linear reduction of the map.

11. The apparatus of claim 8, wherein the reducing of the map is limited to a normalizing of the map according to a size of the object.

12. The apparatus of claim 1, wherein the path generator maps waypoints in the approximate path, generated from the reduced map, into the map before division of the map in order to generate the detailed paths.

13. The apparatus of claim 1, further comprising a memory in which writing and reading of data generated in the operation of the path generator are performed.

14. The apparatus of claim 13, wherein the path generator divides the approximate path into the divided sections based on an available space of the memory.

15. The apparatus of claim 13, the generating of each of the detailed paths in each of the respective divided sections are respectively performed, in parallel, through at least one search algorithm.

16. The apparatus of claim 1, wherein the generating of each of the detailed paths in each of the respective divided sections are respectively performed, in parallel, through at least one search algorithm.

17. The apparatus of claim 1, wherein the object is a mobile robot and the mobile robot is controlled to move sequentially along the detailed paths.

18. The apparatus of claim 1, wherein an illustration of the object is provided by the apparatus as an avatar in a computer generated environment.

19. The apparatus of claim 1, wherein the apparatus is one of a cellular phone, a portable media player (PMP), and a personal digital assistant (PDA).

20. A method of generating a path of an object based on a map, comprising:
generating an approximate path within a reduced map generated from reducing the map;
dividing the map into a plurality of sections based upon divisions of the approximate path; and
generating a detailed path in each of the divided sections based on the approximate path,
wherein the map is a grid map and the reducing of the grid map is performed by respectively anti-aliasing filtering information from different grids of the grid map.

21. The method of claim 20, wherein the map includes the information of the obstacles and the free area in which the object can move unrestrictedly without collision with the obstacles.

22. The method of claim 20, further comprising generating the reduced map by identifying a free area in the map so the object can move unrestrictedly without collision with the obstacles in consideration of a size of the object and by reducing the map including information about the identified free area.

23. The method of claim 20, wherein the dividing of the approximate path includes mapping waypoints in the approximate path into the map.

24. The method of claim 23, wherein the dividing of the map further includes, when one or more of the mapped waypoints are located outside of the free area of the map, moving the one or more waypoints located outside of the free area to closest locations from the waypoints in the free area, respectively.

25. The method of claim 23, wherein the dividing of the map further includes classifying the waypoints mapped into the map according to the divided sections, and
the generating of each detailed path includes respectively setting a start waypoint and a destination waypoint in each of the divided sections, generating each respective detailed path in each of the divided sections, and generating a final detailed path by sequentially combining each detailed path.

26. The method of claim 25, wherein a destination waypoint for at least one divided section overlaps a start waypoint of another divided section.

27. The method of claim 23, further comprising generating the reduced map by identifying a free area in the map so the object can move unrestrictedly without collision with the obstacles in consideration of a size of the object and by reducing the map including information about the identified free area.

28. The method of claim 20, further comprising generating the reduced map generated by reducing the map.

29. The method of claim 28, wherein the map is a grid map and the grid map is reduced using each grid of the free area of the grid map.

30. The method of claim 28, wherein the reducing of the map is a linear reduction of the map.

31. The method of claim 28, wherein the reducing of the map is limited to a normalizing of the map according to a size of the object.

32. The method of claim 20, further comprising mapping waypoints in the approximate path, generated from the reduced map, into the map before division of the map in order to generate the detailed paths.

33. The method of claim 20, wherein the map is divided into the divided sections based on an available space of a memory.

34. The method of claim 33, wherein the generating of each of the detailed paths in each of the respective divided sections are respectively performed, in parallel, through at least one search algorithm.

35. The method of claim 20, the generating of each of the detailed paths in each of the respective divided sections are respectively performed, in parallel, through at least one search algorithm.

36. The method of claim 20, wherein the object is a mobile robot and the method further comprises controlling the mobile robot to move sequentially along the detailed paths.

37. The method of claim 36, further comprising, prior to the generating of the approximate path, sensing an environment of the mobile robot and generating the map with generated obstacle information and free area information for the map so the mobile robot can move unrestrictedly without collision with obstacles represented by the obstacle information.

38. The method of claim 20, wherein the object is provided as an avatar in a computer generated environment.

39. The method of claim 38, further comprising controlling the avatar to move within the generated environment according to the detailed paths.

40. An apparatus for generating a path, comprising:
a path generator generating an approximate path for the object, moving relative to the map, of a reduced map, dividing the map into a plurality of sections based on a mapping of the approximate path of the reduced map into the map, and generating a detailed path in each of the divided sections respectively through at least one search algorithm,
wherein the path generator further sets a start waypoint and a destination waypoint in each of the divided sections based on points from the approximate path and generates the detailed path in each of the divided sections based on a path generating algorithm applied to each divided section using each set start and destination waypoint, and
wherein the map is a grid map and the path generator reduces the grid map by respectively anti-aliasing filtering information from different grids of the grid map.

41. The apparatus of claim 40, wherein the path generating algorithm is at least one of an A-star and D-star algorithm.

42. The apparatus of claim 40, wherein the path generator identifies a free area in the map so the object can move unrestrictedly without collision with the obstacles in consideration of a size of the object, and generates the reduced map by reducing the map including information about the identified free area.

43. The apparatus of claim 42, wherein the respective start and destination waypoints are mapped into the map before division of the map in order to generate the detailed paths.

44. The apparatus of claim 42, wherein when one or more of the mapped waypoints are located outside of the free area in the map, the path generator moves the one or more waypoints located outside of the free area to closest locations from the waypoints in the free area, respectively.

45. The apparatus of claim 40, wherein a destination waypoint for at least one divided section overlaps a start waypoint of another divided section.

46. A method for generating a path, comprising:
generating an approximate path for the object, moving relative to the map, for a reduced map, dividing the map into a plurality of sections based on a mapping of the approximate path of the reduced map into the map, and generating a detailed path in each of the divided sections respectively through at least one search algorithm,
wherein the dividing of the map further comprises setting a start waypoint and a destination waypoint in each of the divided sections based on points from the approximate path and generating the detailed path in each of the divided sections based on a path generating algorithm applied to each divided section using each set start and destination waypoint, and
wherein the map is a grid map and the reduced map is generated by reducing the grid map by respectively anti-aliasing filtering information from different grids of the grid map.

47. The method of claim 46, wherein the path generating algorithm is at least one of an A-star and D-star algorithm.

48. The method of claim 46, further comprising identifying a free area in the map so the object can move unrestrictedly without collision with the obstacles in consideration of a size of the object, and generating the reduced map by reducing the map including information about the identified free area.

49. The method of claim 48, wherein the respective start and destination waypoints are mapped into the map before division of the map in order to generate the detailed paths.

50. The method of claim 48, wherein when one or more of the mapped waypoints are located outside of the identified free area in the map, the one or more waypoints located outside of the free area are moved to closest locations from the waypoints in the identified free area, respectively.

51. The method of claim 46, wherein a destination waypoint for at least one divided section overlaps a start waypoint of another divided section.

52. At least one non-transitory computer readable medium comprising computer readable code to control at least one processing device to implement a method for generating a path of an object, the method for generating the path of the object being based on a map including information of obstacles and information of a free area in which the object can move relative to the map and avoid collision with the obstacles, the method comprising:
generating an approximate path within a reduced map generated from reducing the map including the information of the obstacles and the free area;
dividing the map into a plurality of sections based upon divisions of the approximate path; and
generating a detailed path in each of the divided sections based on the approximate path,
wherein the map is a grid map and the reducing of the grid map is performed by respectively anti-aliasing filtering information from different grids of the grid map.

53. At least one non-transitory computer readable medium comprising computer readable code to control at least one processing device to implement a method for generating a path, the method for generating the path being based on a map including information of obstacles and information of a free area in which an object can move relative to the map and avoid collision with the obstacles, the method comprising:

generating an approximate path for the object, moving relative to the map, for a reduced map, dividing the map into a plurality of sections based on a mapping of the approximate path of the reduced map into the map, and generating a detailed path in each of the divided sections respectively through at least one search algorithm, wherein the dividing of the map further comprises setting a start waypoint and a destination waypoint in each of the divided sections based on points from the approximate path; and generating the detailed path in each of the divided sections based on a path generating algorithm applied to each divided section using each set start and destination waypoint, wherein the map is a grid map and the reduced map is generated by reducing the grid map by respectively anti-aliasing filtering information from different grids of the grid map.

\* \* \* \* \*